UNITED STATES PATENT OFFICE.

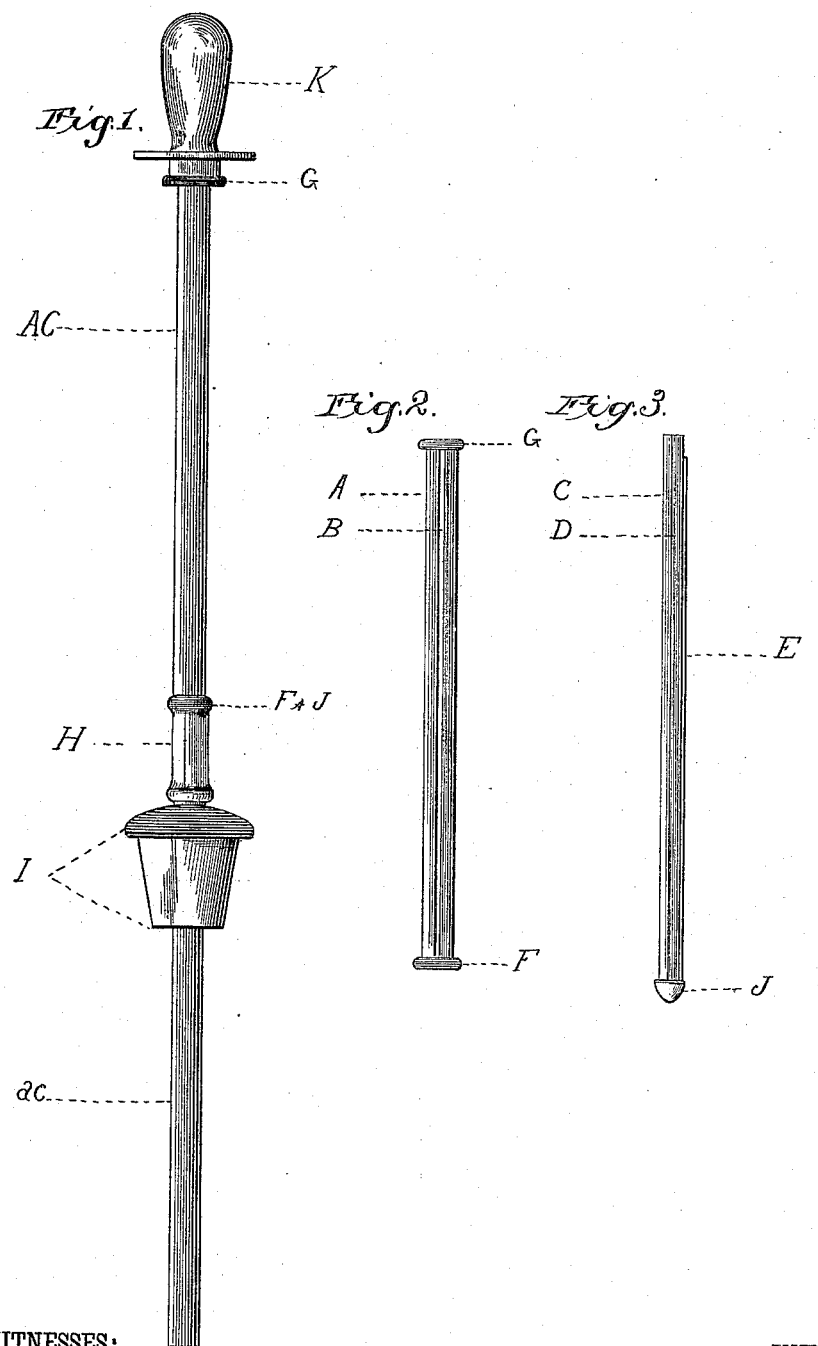

WILLIAM W. TUMBLESON, OF BALTIMORE, MARYLAND.

NURSING-BOTTLE TUBE.

SPECIFICATION forming part of Letters Patent No. 329,103, dated October 27, 1885.

Application filed August 22, 1885. Serial No. 175,048. (Model.)

*To all whom it may concern:*

Be it known that I, WILLIAM W. TUMBLESON, a citizen of the United States, residing at the city of Baltimore, in the State of Maryland, have invented a new and useful Nursing-Tube, of which the following is a full, clear, and exact specification.

My invention relates to improvements in nursing-tubes, in the construction of which hard rubber, celluloid, bone, wood, and similar substances are used, and which are susceptible of being readily cleansed; and the objects of my improvements are durability, cleanliness, and convenience. I attain these objects by the mechanism shown in the accompanying drawings, in which—

Figure 1 is a view of the tube as it appears when ready for use; Fig. 2, the exterior tube, and Fig. 3 the interior tube.

The tube A, with the slot B and the flanges F and G, is made to contain the tube C, which has the slot D, the long flange E, and the tapering flange J.

When the tube C is inserted in tube A, the long flange E completely closes the slot B, thus making the tube A C.

The flanges F and J, when brought together, are covered by the short elastic tube H, which prevents them from being pulled apart. The short elastic tube H connects the tube A C with the tube $a\ c$, (which is a duplicate of the tube A C, and which passes through the cork I into the nursing-bottle.) This connection is entirely above the cork I, and forms a pliable joint.

The flange G is covered by the nipple K, which it holds in place.

By passing a small brush through the slots and running it along the tubes all accumulated matter (which is so injurious to children, and which cannot possibly be separated from an ordinary flexible rubber tube) may readily be removed.

What I claim as my invention, and desire to secure by Letters Patent, is—

A nursing-tube formed by the combination and arrangement of tube C with the slot D, the long flange E, and the tapering flange J, and the tube A, (having slot B and flanges F and G,) all as shown and described.

WILLIAM W. TUMBLESON.

Witnesses:
A. H. GIBBS,
HENRY D. TEIPE.